O. W. PAGE.
AUTOMATIC CONTROLLING DEVICE FOR VEHICLE LAMPS.
APPLICATION FILED SEPT. 28, 1911.
1,046,010.
Patented Dec. 3, 1912.
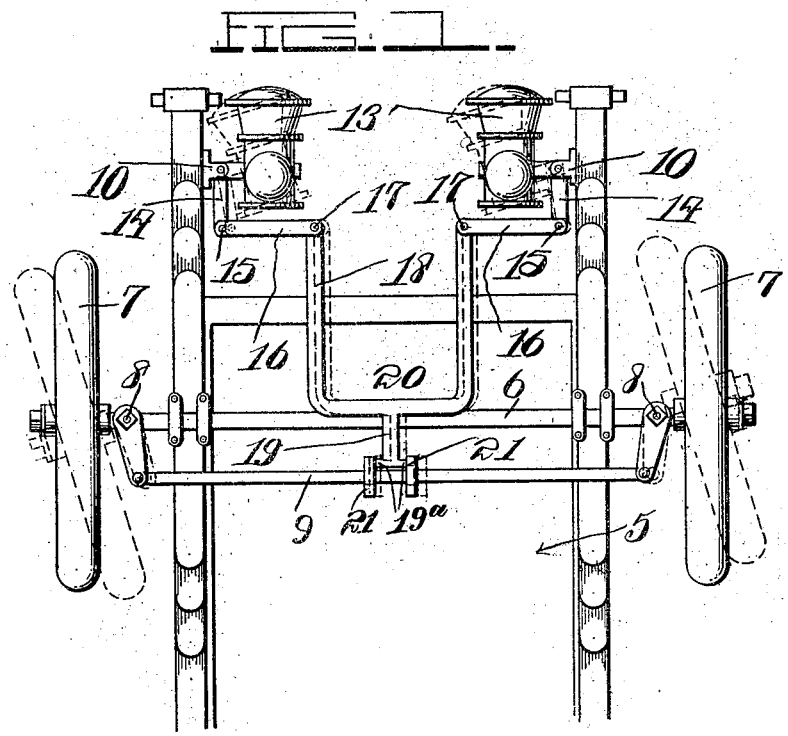
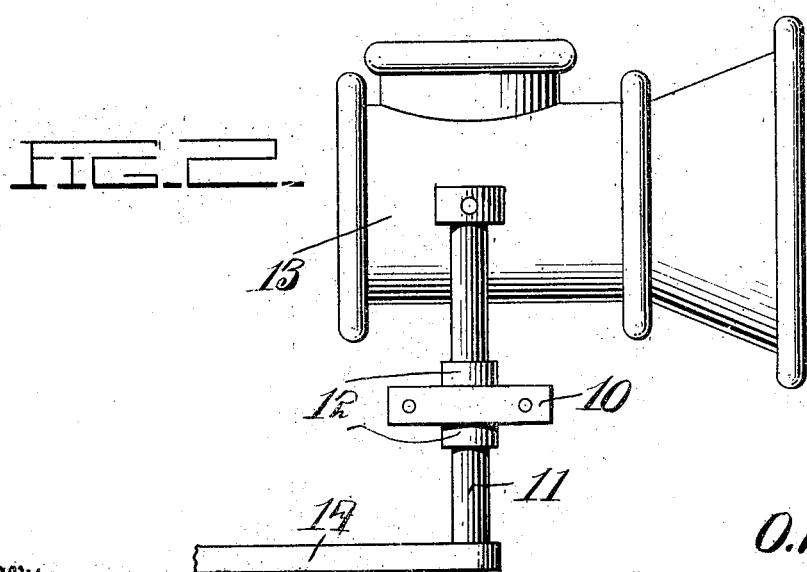
Witnesses
Inventor
O. W. Page
Attorneys

UNITED STATES PATENT OFFICE.

OLIVER W. PAGE, OF IONE, WASHINGTON.

AUTOMATIC CONTROLLING DEVICE FOR VEHICLE-LAMPS.

1,046,010.

Specification of Letters Patent. Patented Dec. 3, 1912.

Application filed September 28, 1911. Serial No. 651,800.

*To all whom it may concern:*

Be it known that I, OLIVER W. PAGE, a citizen of the United States, residing at Ione, in the county of Pendorville, State of Washington, have invented certain new and useful Improvements in Automatic Controlling Devices for Vehicle-Lamps; and I do hereby declare the following to be a full, clear, and exact description of the invention, such as will enable others skilled in the art to which it appertains to make and use the same.

This invention relates to vehicles generally, although the application is more especially intended to be used in connection with motor vehicles.

The principal object of this invention is to provide a novel means for automatically controlling the lamps carried on such vehicles, whereby the beam of light projected by said lamps will be immediately varied with each deviation of the vehicle from a straight path.

Another object of the invention is to provide a device of the character described, which can be readily attached to or detached from any motor vehicle now in general use.

A further object of the invention is to provide an attachment of the character described which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction within the scope of the claim, may be resorted to without departing from the spirit or sacrificing any of the advantages of the invention.

In the drawing: Figure 1 is a bottom plan view of the forward portion of a motor vehicle, showing in solid lines the normal position of the lamps and their actuating means. Fig. 2 is a detail view of the lamp and its bracket.

Like reference numerals designate corresponding parts in all the figures of the drawing.

Referring to the drawing, 5 designates the body of a motor vehicle, and 6 designates the usual front axle thereof to which the front steering wheels 7—7 are connected by the usual knuckles 8—8, said knuckles being connected by a common tie rod 9, whereby said wheels will turn in unison.

Secured to either side of the body in advance of the wheels are brackets 10—10, and in each bracket is journaled a vertical shaft 11. Collars 12—12 are carried by said shaft, and are respectively disposed above and below the bracket for holding the shaft against longitudinal movement. Lamps 13—13 are connected to the upper ends of the shafts 11 to rotate therewith. Extending rearwardly from each shaft 11 is a rocker arm 14, and pivotally connected to the free end of each rocker-arm, as at 15, is one end of an inwardly extending connecting rod 16 and pivotally connected, as at 17—17, to the free ends of a rearwardly extending U-shaped member 18. A rearwardly extending arm 19 is connected at its outer end to the connecting portion 20 of said member, and the rear end of said arm 19 is provided with oppositely extending lateral feet 19ª—19ª, and these feet are fixedly secured to the tie rod 9 by means of clamps 21 of any suitable construction.

From the foregoing, it will be observed that when the front wheels are turned, the tie rod 9 moves therewith, and as a result, the arm 19 is moved laterally carrying with it the U-shaped member 18 and consequently the connecting rods 16—16. As a result of such lateral movement, the rocker arms 14 of the vertical shafts 11 are also shifted to oscillate said shafts 11, thereby directing the beam of light at an angle parallel to the angle of the steering wheels.

What is claimed is:—

In combination with an automobile including the tie rod of its steering device, of lamps pivotally mounted upon the automobile, a U-shaped element having an arm extending from its base, laterally extending feet projecting from the end of the arm, clamping elements engageable with the feet and tie rod, and operative connections between the ends of the U-shaped elements, and the lamps for swinging the latter upon longitudinal movement of said tie rod.

In testimony, whereof, I affix my signature, in presence of two witnesses.

OLIVER W. PAGE.

Witnesses:
RINALDO GREENAMYERS,
JACK. A. WILBURN.